United States Patent [19]

Phillips

[11] Patent Number: 4,777,758
[45] Date of Patent: Oct. 18, 1988

[54] FISHING LURE

[76] Inventor: Alfred J. Phillips, 806 North Ave., Battle Creek, Mich. 49017

[21] Appl. No.: 134,889

[22] Filed: Dec. 18, 1987

[51] Int. Cl.$^4$ ............................................. A01K 85/00
[52] U.S. Cl. ..................................... 43/42.09; 43/43.2
[58] Field of Search ............... 43/42.09, 43.2, 421, 43/44.2, 44.4, 42.23, 42.36, 42.16, 42.37

[56] References Cited

U.S. PATENT DOCUMENTS

| | | | |
|---|---|---|---|
| 1,069,093 | 7/1913 | Faught. | |
| 2,047,676 | 7/1936 | Edmondson | 43/44.2 |
| 2,160,347 | 5/1939 | Walsh | 43/38 |
| 2,185,507 | 1/1940 | Knapp | 43/38 |
| 2,591,764 | 4/1952 | Allen | 43/44.2 |
| 2,625,767 | 1/1953 | Pokras | 43/42.09 |
| 2,735,210 | 2/1956 | Hinkal | 43/43.6 |
| 2,785,498 | 3/1957 | Youngquist et al. | 43/43.4 |
| 2,811,804 | 11/1957 | Heath | 43/42.1 |
| 3,191,336 | 6/1965 | Cordell | 43/42.37 |
| 3,359,674 | 12/1967 | Strumor | 43/42.09 |
| 3,605,318 | 9/1971 | Santo et al. | 43/43.4 |
| 3,750,321 | 8/1973 | McClellan | 43/42.1 |
| 3,839,812 | 10/1974 | Louthan | 43/43.6 |
| 3,863,378 | 2/1975 | Walker | 43/42.37 |
| 3,867,781 | 2/1975 | Wolfe | 43/42.36 |
| 4,163,337 | 8/1979 | Kress | 43/42.36 |

*Primary Examiner*—M. Jordan
*Attorney, Agent, or Firm*—Samuel Kurlandsky

[57] ABSTRACT

A fishing lure having a body, means for affixing a line to the body, and one or more detent receptacles provided in or on the body, each adapted to receive and retain one of a plurality of accessory devices such as weed-guards, blade holders with spinner blades, and bait holders. The receptacle may be mounted by affixing it to the body of the lure. In a preferred embodiment it may be adhesively affixed in a recess provided in the lure. Alternatively, it may be adhesively affixed to the surface of the lure or directly molded into the body of the lure. The accessory devices may be readily snapped into or screwed into the receptacles where they are firmly retained. The accessory devices may also be snapped out of or screwed out of the receptacles when they are not needed. In an alternative embodiment small magnets may be affixed, one in the cavity of the receptacle and a complementary one at the end of the accessory device, thereby retaining the accessory device when its use is required and permitting easy removal when it is no longer required.

14 Claims, 3 Drawing Sheets

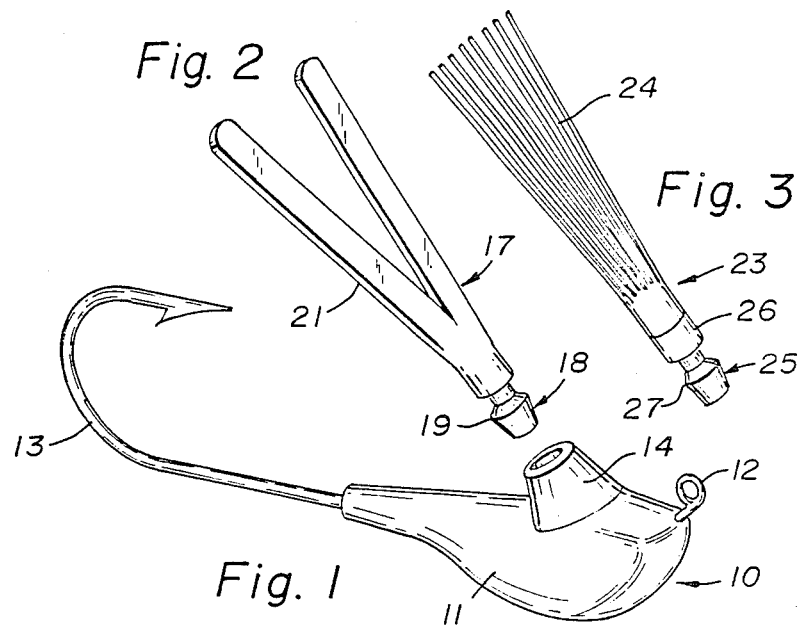
Fig. 2
Fig. 3
Fig. 1
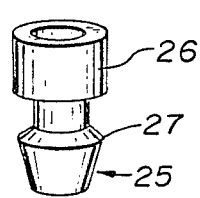
Fig. 4
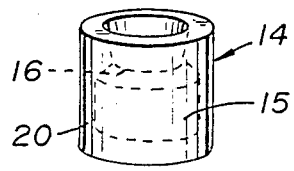
Fig. 5
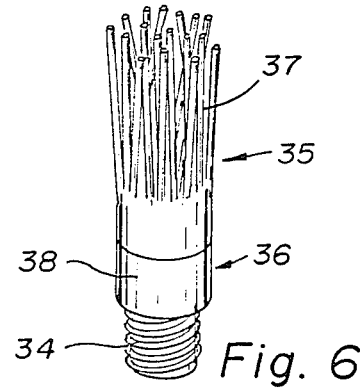
Fig. 6
Fig. 7

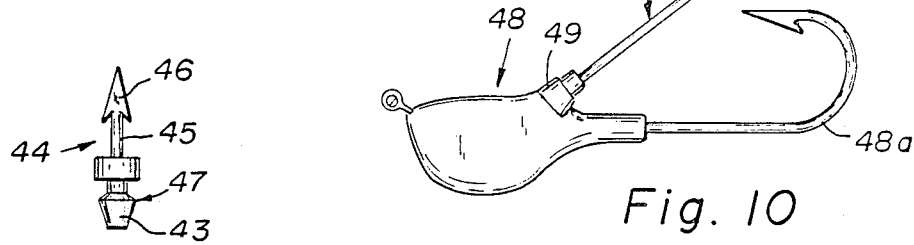
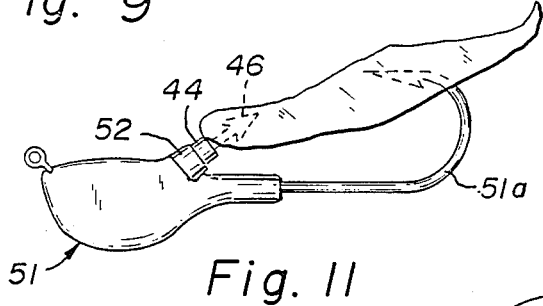
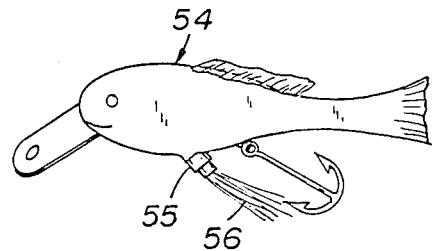
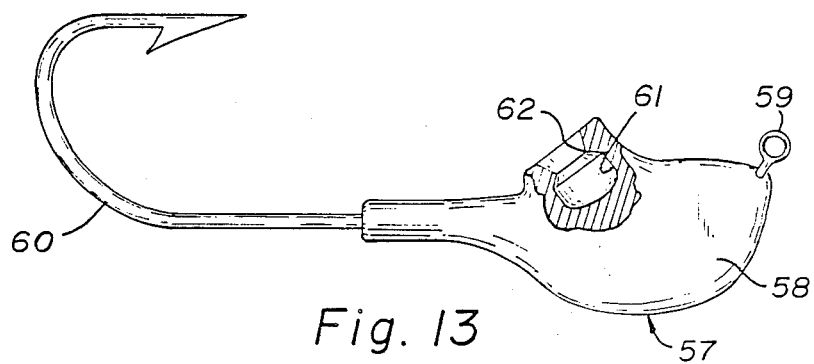

FISHING LURE

BACKGROUND OF THE INVENTION

1. Field of the Invention

The present invention relates to fishing lures, and is more particularly concerned with a fishing lure which is adapted to have various accessory devices readily attached thereto and readily detached therefrom at the choice of the fisherman.

2. Description of the Prior Art

It has been conventional in the prior art to provide fishing lures such as jigs and baits with various accessory devices such as weedguards. In the majority of these lures the weedguards are designed to be directly attached to "loose" single and treble hooks and not directly to the body of the lure. Other lures known in the art which have weedguards directly attached to their bodies are the lead head fishing jigs. Lead head jigs are available in any of many different weights, and may or may not have a weedguard attached directly into the body of the lure. With regard to those which are provided with a weedguard, the weedguard of choice comprises either a bundle of plastic fibers or a Y-shaped piece of plastic cast or glued into the lead head and extending outwardly to cover the point of the hook. The weedguard permits fishermen to safely fish the lure in weeds, brush, timber, rocks, etc. without the danger of constant hangups or snagging of the lure. Lures known in the art and presently available in the market have weedguards which are permanently attached to the lure. Such lures operate very well. However, there are conditions encountered sometimes where the presence of a weedguard is undesirable as it may interfere with the setting of the hook when a fish strikes. It is then necessary to cut off the weedguard. It is a fact that most of the lead head jigs manufactured and marketed today, particularly for bass fishermen, have a permanently attached weedguard. Because there are anglers who will never fish with a jig which has a weedguard, and because there are other fishermen who may want to fish at certain times without a weedguard, the weedguard is often cut off the lure, with no means of reattachment.

A unique spinnerbait fishing lure is presently being marketed that utilizes a removable weedless lead head jig in its configuration. The spinnerbait lure itself is a fairly weedless fishing lure and the hook does not need to be weedless. Therefore, many anglers cut off the weedguard from the spinnerbait lure because they believe it is unnecessary and that some fish may be lost because of interference that might be caused by the weedguard. Cutting the weedguard off the jig, however, defeats the full utilization of the spinnerbait product.

SUMMARY OF THE INVENTION

It is an object of the invention to provide a fishing lure having one or more accessory devices affixed thereto.

It is a further object of the invention to provide a fishing lure having means whereby the accessory devices may be readily removed when they are not required, and may be readily reattached when it is desired to use them again.

It is a primary object of the invention to provide a fishing lure having a weedguard which can be removed when its use is not required, and which can be readily reattached to the lure when its use is once again required.

The foregoing and other objects, advantages and characterizing features of the invention will become apparent from the following description of certain illustrative embodiments thereof, considered together with the accompanying drawing, wherein like reference numerals signify like elements throughout the various figures.

According to the invention, a fishing lure is provided with one or more detent receptacles each having detent means provided therein. One or more accessory devices are provided, each having a complementary detent engaging device at one end. As a result, the accessory devices may be readily mounted on the fishing lure and readily demounted as desired.

BRIEF DESCRIPTION OF THE DRAWINGS

In the drawings:

FIG. 1 is a perspective view of a fishing lure according to the invention.

FIG. 2 is a side elevational view of a V-shaped weedguard adapted to be inserted in the receptacle of the lure shown in FIG. 1.

FIG. 3 is a side elevational view of a fiber type weedguard adapted to be inserted into the receptacle of the lure shown in FIG. 1.

FIG. 4 is a side elevational view of the detent end of the weedguard shown in FIG. 3.

FIG. 5 is a view in cross-section of the receptacle shown in FIG. 1.

FIG. 6 is a side elevational view of a fiber type of weedguard having a screw-threaded end.

FIG. 7 is a view in cross-section of a receptacle according to the invention having an internal thread complementary to that of the structure shown in FIG. 6.

FIG. 8 is a side elevational view of a blade holder.

FIG. 9 is a side elevational view of a bait holder.

FIG. 10 is a side elevational view of a lure according to the invention having a blade holder with a blade mounted thereon.

FIG. 11 is a side elevational view of a lure having a bait holder mounted in the detent receptacle thereof and having a worm affixed thereon.

FIG. 12 is a side elevational view of a conventional lure having a detent receptacle adhesively affixed thereto and having a weedguard mounted in the receptacle.

FIG. 13 is a side elevational view partly in cross-section showing a lure having a detent receptacle directly molded into the body of the lure.

DESCRIPTION OF THE PREFERRED EMBODIMENTS

Figure 14:
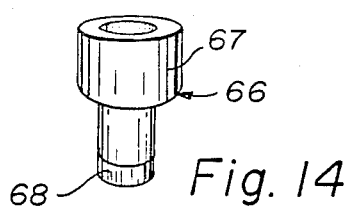
FIG. 14 is a side elevational view of a detent end having an end thereof formed of a ferromagnetic material.

Referring to FIG. 1, a fishing lure 10 according to the invention is shown having a body 11, an attachment eye 12 and a hook 13. Affixed within a recess provided in the body 11 by means such as an adhesive is a detent receptacle 14 having a cavity 15 therein (shown in FIG. 5) adapted to receive and retain the detent ends of various accessory devices.

Referring to FIG. 2, an accessory device is shown in the form of a Y-shaped weedguard 17 having a detent end 18 having a detent ridge 19. A split fiber 21 provides weedguard function.

Referring to FIGS. 3 and 4, a modified weedguard 23 is shown having a plurality of fibers 24, a detent end 25 and a cup 26 in which the ends of the fibers 25 are adhesively affixed. The detent end 25 is shown in greater detail in FIG. 4, and comprises the cup 26 and a detent ridge 27.

Referring to FIG. 5, the detent receptacle 14 shown in FIG. 1 is illustrated in greater detail and comprises a body 20 having a cavity 15 with a detent constriction 16 at its neck. The detent receptacle 14 may be adhesively affixed to the body of a lure or may be directly molded thereinto.

Referring to FIG. 6, a weedguard 35 is shown comprising a detent end 36 having a plurality of fibers 37 adhesively affixed inside a cup 38 provided in the detent end 36. The end of the detent end is provided with screw threads 34 to provide detent action.

FIG. 7 shows a detent receptacle 31 having a cavity 32 and having its inner wall provided with screw threads 33 complementary to the screw threads 34 of the detent end 36.

FIG. 8 shows an accessory device in the form of a blade holder 39 having an elongate body 40, an eye 41 at one end to which a spinner blade may be attached, and a detent end 42 similar to that shown in FIG. 4 at the other end.

FIG. 9 illustrates an accessory device in the form of a bait holder 44 comprising a shaft 45, having one or more barbs 46 at one end and a detent end 47 at the other end which in FIG. 9 is provided with a split 43 to provide spring action.

FIG. 10 illustrates a lure 48 on which is adhesively mounted a detent receptacle 49 in which is mounted a blade holder 39 similar to that shown in FIG. 8, and having a spinner blade 50 mounted thereon. A hook 48a is affixed to the lure 48.

FIG. 11 illustrates a lure 51 having a hook 51a affixed thereto, and having a detent receptacle 52 adhesively mounted thereon, having a bait holder 44 similar to that shown in FIG. 9 retained in the receptacle 52, and having a worm impaled over the barb 46 of the bait holder 44 and over the hook 51a.

FIG. 12 illustrates a conventional fishing lure 54 to which a receptacle 55 has been added having a weedguard 56 retained therein.

FIG. 13 illustrates a fishing lure in the form of a lead head jig 57 having a body 58, an eye 59, and a hook 60. A detent receptacle cavity 61 is directly molded into the body 58 when it is being formed. The detent receptacle cavity 61 has a detent constriction 62 at its neck.

Referring to FIG. 14, a detent end 66 is shown having a cup 67 and a ferromagnetic end 68.

Figure 15:
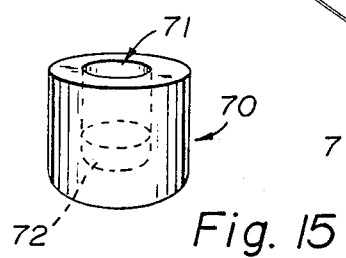
FIG. 15 is a side elevational view of a detent receptacle having a permanent magnet mounted in a cavity therein for providing detent action to secure a detent end of a supplementary device.

FIG. 15 shows a detent receptacle 70 which is complementary with the detent end 66, and comprises a cavity 71 having a permanent magnet affixed therein. The structure is designed to retain the detent end 66 magnetically.

Figure 16:
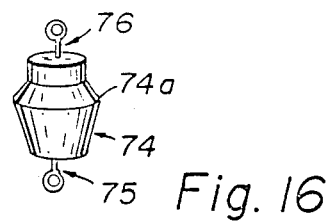
FIG. 16 is a side elevational view of a detent end provided with an eye at each end, one to have a hook connected thereto, and the other to have a line connected thereto.

Referring to FIG. 16, a detent end 74 is shown having an enlarged detent ridge 74a, an eye 75 at one end and an eye 76 at the other.

Figure 17:
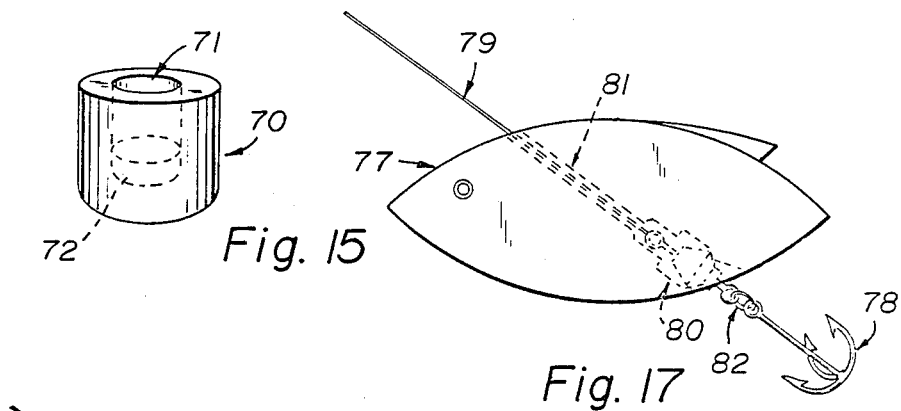
FIG. 17 is a side elevational view of a lure having a detent receptacle affixed therein and a detent end such as shown in FIG. 16 retained therein and with a hook affixed to an eye of the detent end.

Referring to FIG. 17, a fishing lure 77 is shown having a detent end 74 such as shown in FIG. 16 mounted in a detent receptacle 80 similar to that shown in FIG. 5 except that a hole is provided in the bottom of the receptacle to permit the eye 75 of the detent end 74 to pass therethrough and to extend into a fishing lure channel 81. A hook 78 is affixed to the eye 76 of the detent end 74 by means of a split ring 82. A fishing line 79 is affixed to the eye 75 of the detent end 74.

Figure 18:
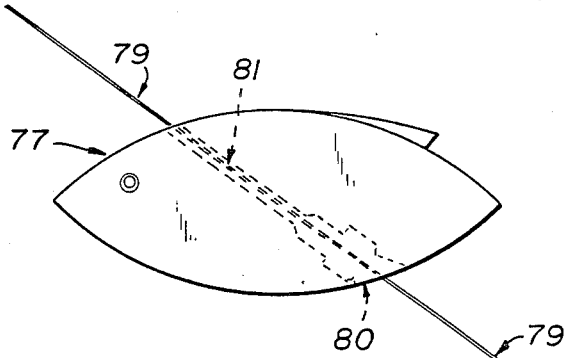
FIG. 18 is a side elevational view of the lure shown in FIG. after the detent end as shown in FIG. 16 has been dislodged and the hook has become free of the lure.

FIG. 18 shows the lure 77 of FIG. 17 after a fish has struck the lure and become engaged by the hook 78. The force of the strike has caused the detent end 74 to become disengaged from the detent receptacle 80 and the hook to be drawn away from the body of the lure. This reduces the leverage a fish uses to throw a normal lure when the fish becomes hooked, and provides the fisherman a better opportunity to haul in the fish.

The fishing lures of the present invention which have detent receptacles mounted thereon and complementary accessory devices which can be readily inserted and retained in the receptacles and readily removed when not required have many advantages over fishing lures known in the prior art. Their structure permits any of a number of accessory devices to be readily mounted thereon and readily removed when desired. For example weedguards may be readily mounted on the lures with a snap in or pop in motion when the need therefore arises. When the need no longer exists, the weedguards may be readily removed, permitting the fisherman to take advantage of the better hooking action obtainable from a lure without a weedguard. Other accessory devices such as blade holders or bait holders may be readily added to the lure when needed, and quickly removed when no longer needed.

The detent receptacles may be formed of any of a large number of materials such as plastics, rubber, or metals. They may be mounted on the body of the lure by an adhesive such as an epoxy resin. Alternatively they may be directly molded into the body of the lure, especially in the case of a lead head jig.

Detent action between the detent receptacle and the end of the accessory devices may be obtained by a pop in arrangement such as that in the case of the structures shown in FIGS. 1-5. Alternatively, a detent arrangement can be obtained by complementary screw members, such as shown by the structures of FIGS. 6 and 7.

Although the invention has been described in connection with only specific embodiments thereof, it is evident that many alternatives, modifications, and variations will be apparent to those skilled in the art in the light of the foregoing description and drawings. Accordingly, it is intended to embrace all such alternatives, modifications and variations within the spirit and scope of the appended claims.

Invention is claimed as follows:

1. A fishing lure having an integral body, means for being affixed to a fishing line, and one or more hooks, said body having a laterally positioned recess and a separate detent receptacle affixed therein, said detent receptacle comprising a housing defining a cavity having an opening to the exterior, said detent receptacle having detent means provided therein, and an accessory device having detent means at one end complementary to the detent means of said detent receptacle, whereby when the detent means of said accessory device is inserted into the cavity of said detent receptacle, it is firmly retained therein, and whereby said accessory device may be readily removed from said detent receptacle and readily reinserted when so desired.

2. A fishing lure according to claim 1, wherein the detent means of said detent receptacle is a constriction of the opening of said cavity to the exterior, and the detent means of said accessory device is a circumferential ridge.

3. A fishing lure according to claim 2, wherein the detent end of said accessory device is split to provide spring action.

4. A fishing lure according to claim 1, wherein the detent means of said detent receptacle and the detent means of said accessory device are complementary screw threads.

5. A fishing lure according to claim 1, wherein said accessory device is a weedguard.

6. A fishing lure according to claim 5, wherein said weedguard is Y-shaped.

7. A fishing lure according to claim 5, wherein said weedguard comprises a plurality of fibers.

8. A fishing lure according to claim 1, wherein said accessory device is a bait holder having an impaling barb thereon.

9. A fishing lure according to claim 1, wherein said accessory device is a blade holder having a spinner blade mounted thereon.

10. A fishing lure according to claim 1, wherein said detent receptacle is adhesively affixed to the body of said lure.

11. A fishing lure according to claim 1, wherein said detent receptacle is directly molded into the body of said lure.

12. A fishing lure according to claim 1, wherein said lure is a lead head jig.

13. A fishing lure according to claim 1, wherein said detent receptacle has a permanent magnet in the cavity therein, and said detent end is formed of a ferromagnetic material.

14. A fishing lure according to claim 1, wherein a hook is provided connected to a detent end engaged in a detent receptacle in said lure, the other end of said detent end being connected to a line passing through a channel provided in said lure, whereby when a fish grabs said hook, said detent end is released from said detent receptacle and said hook becomes substantially free of said lure.

* * * * *